US011790740B2

(12) United States Patent
Watanabe et al.

(10) Patent No.: US 11,790,740 B2
(45) Date of Patent: Oct. 17, 2023

(54) VIBRATION PRESENTATION APPARATUS

(71) Applicant: NIPPON TELEGRAPH AND TELEPHONE CORPORATION, Tokyo (JP)

(72) Inventors: Junji Watanabe, Tokyo (JP); Yutaka Kamamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 17 days.

(21) Appl. No.: 17/763,162

(22) PCT Filed: Sep. 26, 2019

(86) PCT No.: PCT/JP2019/037778
§ 371 (c)(1),
(2) Date: Mar. 23, 2022

(87) PCT Pub. No.: WO2021/059422
PCT Pub. Date: Apr. 1, 2021

(65) Prior Publication Data
US 2022/0343741 A1 Oct. 27, 2022

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC ............... G08B 6/00; H04R 1/00; H04R 3/00
See application file for complete search history.

(56) References Cited

U.S. PATENT DOCUMENTS 6,369,312 B1 4/2002 Komatsu
10,824,390 B1 * 11/2020 Khaleghimeybodi ....................... G02B 27/017
10,863,264 B2 * 12/2020 Sampson ................ G06F 3/016
2018/0109849 A1 * 4/2018 Moran .................. G11B 27/34
(Continued)

FOREIGN PATENT DOCUMENTS

JP 200186580 A 3/2001
WO 2018061528 A1 4/2018

OTHER PUBLICATIONS

Nippon Telegraph and Telephone Corporation (2019) "Exhibited Nippon Telegraph and Telephone Mikakaland NTT Super Future Research Institute6" at "NicoNico Chokaigi 2019" literature.
(Continued)

*Primary Examiner* — Toan N Pham

(57) ABSTRACT

Provided is a vibration presentation system that allows a user to perceive vibrations in bodily sensing the vibrations at various body sites without feeling unnatural. The vibration presentation system for presenting vibration signals for perception by a tactile sense for media content includes a vibrating body configured to generate vibrations corresponding to the vibration signals of a plurality of channels respectively, wherein each of the vibration signals of the plurality of channels is for any of specific body sites, and the vibrations generated by the vibrating body are provided with a time difference such that, for the vibrations for the specic body sites to be perceived at the same time, a vibration for a body site of the specific body sites that is farther from the brain is earlier generated.

20 Claims, 5 Drawing Sheets

(56) References Cited

U.S. PATENT DOCUMENTS

| | | | | |
|---|---|---|---|---|
| 2019/0228619 | A1 | 7/2019 | Yokoyama et al. | |
| 2022/0283640 | A1* | 9/2022 | Myokan | G06F 3/016 |

OTHER PUBLICATIONS

Nippon Telegraph and Telephone Corporation (2019) [Super Tactile Lab!] Smartphone edition, Nico Nico Chokaigi 2019 [online] website: https://chokaigi.jp/2019/plan/choshokkanlabosumahohen html.

Nippon Telegraph and Telephone Corporation (2019) "Measure" feeling and empathy that deepens by touching" from the group" NTT Communication Science Laboratories Open House, May 30, 2019 [online] website: https://www.kecl.ntt.co.jp/openhouse/2019/exhibition13/index.html.

* cited by examiner

VIBRATION PRESENTATION APPARATUS

CROSS-REFERENCE TO RELATED APPLICATIONS

This application is a U.S. National Stage Application filed under 35 U.S.C. § 371 claiming priority to International Patent Application No. PCT/JP2019/037778, filed on 26 Sep. 2019, the disclosure of which is hereby incorporated herein by reference in its entirety.

TECHNICAL FIELD

The present invention relates to a technique for simultaneously reproducing acoustic signals for perception by an auditory sense and vibration signals for perception by a tactile sense, for media content, such as music, for example.

BACKGROUND ART

Such techniques for simultaneously reproducing an acoustic signal and a vibration signal includes that disclosed in PTL 1. PTL 1 describes a technique for generating and presenting a body sensory vibration signal from right and left two-channel acoustic signals, in which the generated body sensory vibration signal is presented to various human body sites, an acoustic signal is subjected to low-pass filtering to obtain a low range of body sensory vibration signals, frequency characteristics are changed for each body site, and a size for the presentation is adjusted by a volume control.

CITATION LIST

Patent Literature

PTL 1: JP 2001-86580 A

SUMMARY OF THE INVENTION

Technical Problem

According to the technique disclosed in PTL 1, a user can bodily sense, at various body sites, vibrations in a magnitude and frequency characteristics suitable for each body site. However, the technique of PTL 1 does not take into account perception by the brain of the user in bodily sensing vibrations at the various body sites.

An object of the present invention is to provide a vibration presentation system that allows a user to perceive vibrations in bodily sensing the vibrations at various body sites without feeling unnatural.

Means for Solving the Problem

An aspect of the present invention is a vibration presentation system for presenting vibration signals for perception by a tactile sense for media content, the vibration presentation system including a vibrating body configured to generate vibrations corresponding to the vibration signals of a plurality of channels respectively, wherein each of the vibration signals of the plurality of channels is for any of specific body sites, and the vibrations generated by the vibrating body are provided with a time difference such that, for the vibrations for the specic body sites to be perceived at the same time, a vibration for a body site of the specific body sites that is farther from the brain is earlier generated.

Effects of the Invention

According to the present invention, a user can perceive vibrations in bodily sensing the vibrations at various body sites without feeling unnatural.

DESCRIPTION OF EMBODIMENTS

A vibration presentation system according to the present invention is for simultaneously reproducing acoustic signals for perception by an auditory sense and vibration signals for perception by a tactile sense, for media content such as music. The vibration presentation system according to the present invention may simultaneously reproduce the acoustic signals and the vibration signals, or the vibration presentation system according to the present invention may reproduce only vibration signals simultaneously with an apparatus or system other than the vibration presentation system according to the present invention reproducing the acoustic signals. Hereinafter, embodiments of the present invention will be described in detail with reference to the drawings.

First Embodiment

Figure 1:
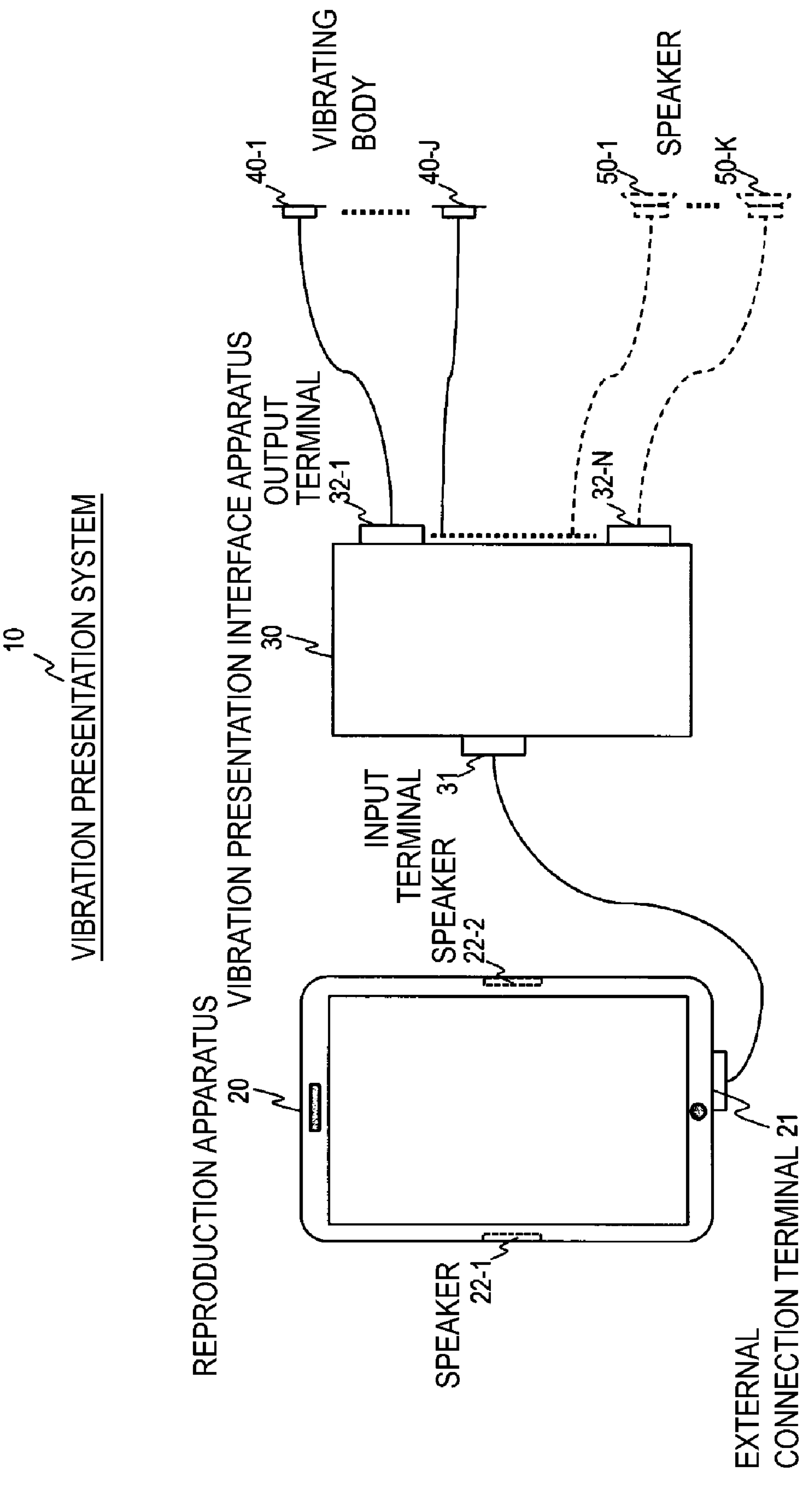
FIG. 1 is a diagram illustrating a configuration of a vibration presentation system 10.

A hardware configuration of a vibration presentation system 10 according to a first embodiment is as illustrated in FIG. 1, and may include a reproduction apparatus 20, a vibration presentation interface apparatus 30, a vibrating body 40-*j* (where j is an integer equal to or more than 1 and equal to or less than J, J is an integer equal to or more than 2), and a speaker 50-*k* (k is an integer equal to or more than 1 and equal to or less than K, K is an integer equal to or more than 1). Each component will be described below.

Reproduction Apparatus 20

The reproduction apparatus 20 is an apparatus that outputs time series signals of a plurality of channels (N channels, N is an integer of 2 or more) for media content such as music, and is, for example, a smart phone or a tablet terminal. In a case that the vibration presentation system 10 does not include the speaker 50-*k*, it is sufficient that N is the same value as the number J of vibrating bodies 40-*j*, and in a case that the vibration presentation system 10 includes the speaker 50-*k*, it is sufficient that N is a value obtained by adding the number J of vibrating bodies 40-*j* and the number K of 50-*k*.

N-channel time series signals may include digital vibration signals of a plurality of channels, and may include digital acoustic signals of one or more channels. Each digital vibration signal may be a digital vibration signal obtained by processing a digital acoustic signal of music included in the media content or the like by low-pass filtering or the like, or may be a digital vibration signal prepared for vibration presentation separately from a digital acoustic signal of music included in the media content or the like.

An example of eight-channel time series signals is for presenting, to each of two users, signals of four channels in total including acoustic signals of two channels to be perceived by an auditory sense and vibration signals of two channels to be perceived by a tactile sense, the 8-channel of time series signals including a left channel digital acoustic signal of two-channel stereo digital acoustic signals as a first channel time series signal, a right channel digital acoustic signal of the stereo digital acoustic signals as a second channel time series signal, a digital vibration signal corresponding to the left channel digital acoustic signal of the stereo digital acoustic signals as a third channel time series signal, a digital vibration signal corresponding to the right channel digital acoustic signal of the stereo digital acoustic signals as a fourth channel time series signal, and fifth to eighth channel time series signals which are the same as the respective first to fourth channel time series signals.

The reproduction apparatus 20 stores in a storage not illustrated or receives from a receiver not illustrated the N-channel time series signals for the media content. The reproduction apparatus 20 reads from the storage or receives from the receiver and outputs to an external connection terminal 21 the N-channel time series signals. The external connection terminal 21 is, for example, a USB terminal.

Note that the reproduction apparatus 20 may store in the storage or receive from the receiver digital acoustic signals of one or more channels, to generate digital vibration signals from the digital acoustic signals. For example, the reproduction apparatus 20 may store in the storage or receive from the receiver the digital acoustic signals, and process the read or received digital acoustic signals by low-pass filtering to generate the digital vibration signals.

The reproduction apparatus 20 may store or receive a code obtained by compressing the N-channel time series signals in place of the N-channel time series signals, in order to suppress a storage capacity and a reception capacity. The N-channel time series signals are highly similar between the channels. For this reason, for example, the storage capacity and the reception capacity can be greatly reduced compared to those in a case that the N-channel time series signals are stored or received as they are, by storing or receiving, for each channel, a code obtained by coding a signal having higher compression efficiency among a time series signal, a weighted difference signal between the channels, and a further weighted difference signal of the weighted difference signal like by a coding scheme corresponding to the MPEG-4 ALS standard multi-channel decoding scheme (ISO/IEC 14496-3 11.6.8.1.2). In a case of storing or receiving a code obtained by compression, it is sufficient that the reproduction apparatus 20 decodes the code by a multi-channel decoding scheme according to the MPEG-4 ALS standard that is a decoding scheme corresponding to the coding scheme used for the compression, to obtain the N-channel time series signals.

Note that, instead of outputting the digital acoustic signals in the N-channel time series signals to the external connection terminal 21, the reproduction apparatus 20 may input the digital acoustic signals to a DA converter not illustrated included in the reproduction apparatus 20 to convert the digital acoustic signals into analog signals, and input the analog signals to speakers 22-1 and 22-2 included in the reproduction apparatus 20 so as to generate acoustic signals (air vibration) corresponding to the analog signals.

Vibration Presentation Interface Apparatus 30

The vibration presentation interface apparatus 30 includes an input terminal 31 and an output terminal **32-*n* (n is an integer equal to or more than 1 and equal to or less than N). The input terminal 31 is, for example, a USB terminal. The input terminal 31 of the vibration presentation interface apparatus 30 is connected to the external connection terminal 21 of the reproduction apparatus 20, for example, via a USB cable. The output terminal 32-*n* is, for example, a mini phone jack. However, for example, adjacent two of n output terminals 32-*n*** may be collected to be a mini-stereo phone jack.

The vibration presentation interface apparatus 30 DA-converts each of the N-channel time series signals input from the input terminal 31, to obtain an analog signal, and outputs each of the N-channel analog signals from a corresponding output terminal **32-*n***.

In the case of the example of the 8-channel time series signal described above, the vibration presentation interface apparatus 30 outputs a left channel analog acoustic signal corresponding to the first channel time series signal from the output terminal 32-1, outputs a right channel analog acoustic signal corresponding to the second channel time series signal from the output terminal 32-2, outputs a left channel analog vibration signal corresponding to the third channel time series signal from the output terminal 32-3, outputs a right channel analog vibration signal corresponding to the fourth time series signal from the output terminal 32-4, outputs a left channel analog acoustic signal corresponding to the fifth channel time series signal from the output terminal 32-5, outputs a right channel analog acoustic signal corresponding to the sixth channel time series signal from the output terminal 32-6, outputs a left channel analog vibration signal corresponding to the seventh time series signal from the output terminal 32-7, and outputs a right channel analog vibration signal corresponding to the eighth time series signal from the output terminal 32-8.

Note that the vibration presentation interface apparatus 30 may include a known magnitude adjustment mechanism (for example, a volume knob and a volume controller) for the user to adjust a magnitude of each analog signal output from the output terminal **32-*n*** or a magnitude of the stereo analog signals per two channels.

In a case that the reproduction apparatus 20 does not output the digital acoustic signals of the N-channel time series signals, the vibration presentation interface apparatus 30 is only required to DA-convert each of the time series signals excluding the digital acoustic signals from the N-channel time series signals input from the input terminal 31, that is, the digital vibration signals input from the input terminal 31, to obtain an analog vibration signal, and output each obtained analog vibration signal from the corresponding output terminal **32-*n***.

Vibrating Body **40-*j***

The vibrating body **40-*j* is connected to the corresponding output terminal 32-*n* of the vibration presentation interface apparatus 30 via an analog signal transmission cable. The vibrating body 40-*j* generates a vibration corresponding to the analog vibration signal output by the corresponding output terminals 32-*n* of the vibration presentation interface apparatus 30. The vibrating body 40-*j* is a speaker provided with, for example, a metal cone, and may be provided with a cover so as to be easy for a user to grip, or may be provided with a belt so as to be easy for a user to wear. The vibrating body 40**-*j* may, for example, be a product equipped with a speaker provided with a metal cone, and may be, for example, a seat surface of a chair seated by a user with the speaker provided with the metal cone being equipped near the seat surface to vibrate the seat surface, or a surface of a desk touched by a user with the speaker provided with the metal cone being equipped near the surface of the desk to vibrate the surface. The vibration generated by the vibrating body 40-*j* is transmitted to a body site of the user in contact with the vibrating body 40-*j*, and is perceived by the user as vibration.

In the case of the example of the 8-channel time series signals described above, the vibration presentation system 10 includes four vibrating bodies of vibrating bodies 40-1 to 40-4. The vibrating body 40-1 generates vibration corresponding to a left channel analog vibration signal output by the output terminal 32-3 of the vibration presentation interface apparatus 30. The vibrating body 40-2 generates vibration corresponding to a right channel analog vibration signal output by the output terminal 32-4 of the vibration presentation interface apparatus 30. The vibrating body 40-3 generates vibration corresponding to a left channel analog vibration signal output by the output terminal 32-7 of the vibration presentation interface apparatus 30. The vibrating body 40-4 generates vibration corresponding to a right channel analog vibration signal output by the output terminal 32-8 of the vibration presentation interface apparatus 30.

Speaker 50-*k*

The speaker 50-*k* is connected to the corresponding output terminal 32-*n* of the vibration presentation interface apparatus 30 via an analog signal transmission cable. The speaker 50-*k* generates an acoustic vibration (air vibration, sound) corresponding to the analog vibration signal output by the corresponding output terminals 32-*n* of the vibration presentation interface apparatus 30. The speaker 50-*k* may be earphones, for example, such that the acoustic signal corresponding to the analog signal output by the output terminal 32-*n* reaches the user's ears with a small delay time. The acoustic vibration generated by the speaker 50-*k* is transmitted to the user's ears and is perceived by the user as sound.

In the case of the example of the 8-channel time series signals described above, the vibration presentation system 10 includes four speakers of speakers 50-1 to 50-4. The speaker 50-1 generates an acoustic signal corresponding to a left channel analog acoustic signal output by the output terminal 32-1 of the vibration presentation interface apparatus 30. The speaker 50-2 generates an acoustic signal corresponding to a right channel analog acoustic signal output by the output terminal 32-2 of the vibration presentation interface apparatus 30. The speaker 50-3 generates an acoustic vibration corresponding to a left channel analog acoustic signal output by the output terminal 32-5 of the vibration presentation interface apparatus 30. The speaker 50-4 generates an acoustic vibration corresponding to a right channel analog acoustic signal output by the output terminal 32-6 of the vibration presentation interface apparatus 30.

Second Embodiment

The vibration presentation system may present vibrations that take into account perception by the brain of the user bodily sensing the vibrations at a plurality of body sites of the user. This embodiment is described as a second embodiment.

A hardware configuration of the vibration presentation system 10 according to the second embodiment is the same as the hardware configuration of the vibration presentation system 10 according to the first embodiment. The vibration presentation system 10 according to the second embodiment differs from the vibration presentation system 10 according to the first embodiment in taking into account that relative relationships of vibrations for the plurality of body sites are to be perceived by the brain in bodily sensing the vibrations at the plurality of body sites. Hereinafter, differences from the first embodiment will be described.

Neurotransmission Time, Cognitive Correction

Vibrations given to the body sites of the user are transmitted to the brain through nerves. The vibration input to the body site farther from the brain takes a longer time to be transmitted to the brain. In other words, a neurotransmission time is longer. Accordingly, the longer a neural distance from the brain to the body site given the vibration, the longer a delay time is taken from when the vibration is actually exerted until the user perceives the vibration. As such, the reproduction apparatus 20 earlier outputs each of digital vibration signal samples for the respective body sites to be perceived at the same time, to the body site farther from the brain. More precisely, because the digital vibration signal is a time series signal, the reproduction apparatus 20 outputs a plurality of digital vibration signals with a time difference provided such that each of the digital vibration signal samples for the respective body sites to be perceived at the same time is earlier output to the body site that is farther from the brain.

In other words, for a relative relationship between two body sites, concerning a digital vibration signal sample for a first body site and a digital vibration signal sample for a second body site which are to be perceived at the same time, if the second body site is farther from the brain than the first body site is, the reproduction apparatus 20 outputs a digital vibration signal for the first body site and a digital vibration signal for the second body site with a time difference provided therebetween such that the digital vibration signal sample for the second body site is output earlier than the digital vibration signal sample for the first body site.

For example, in a case of outputting eight kinds of digital vibration signals including those for a neck, left shoulder, right shoulder, left hand, right hand, back, left foot, and right foot, the reproduction apparatus 20 may output eight kinds of digital vibration signals such that the digital vibration signal samples to be perceived at the same time for the left and right feet are the earliest, next are for the left and right hands, next are for the back, next are for the left and right shoulders, and the latest is for the neck.

Note that cognitive correction may also be considered in addition to the neurotransmission time. The vibrations given to the body sites of the user are transmitted to the brain through the nerves, and then, subjected to information processing in the brain to be perceived by the user. In the information processing in the brain, a short time difference of about 1 second or less is subject to cognitive correction to absorb the difference between the neurotransmission times. For example, even if an arrival time, to the brain, of a vibration given to a body site farther from the brain is slightly later than an arrival time, to the brain, of a vibration given to a body site nearer the brain, the cognitive correction may be made for perception that the vibrations simultaneously occurred. As such, the time difference described above, i.e., the time difference between the digital vibration signal samples ought to be perceived at the same time among the plurality of digital vibration signals output by the reproduction apparatus 20, is preferentially set to a value that is obtained by subjecting the neurotransmission time difference between to the body sites to be given the digital vibration signals to the cognitive correction, that is, a value smaller than the neurotransmission time difference, more specifically, a value smaller by the cognitive correction than the neurotransmission time difference. However, without necessarily taking into account the cognitive correction, the time difference described above may be the neurotransmission time difference between the body sites to be given the digital vibration signals, or may be a value between the neurotransmission time difference between the body sites to be given the digital vibration signals and a value obtained by subjecting the neurotransmission time difference to the cognitive correction. Of course, the time difference described above may be a value approximating the neurotransmission time difference or a value approximating the value obtained by subjecting the neurotransmission time difference to the cognitive correction. For example, concerning a digital vibration signal sample for a hand and a digital vibration signal sample for a foot that are to be perceived at the same time, the digital vibration signal sample for the foot may be output earlier than the digital vibration signal sample for the hand by about 30 to 50 ms corresponding to the neurotransmission time difference. The digital vibration signal sample for the foot may be output earlier than the digital vibration signal sample for the hand by about 10 to 20 ms corresponding to the value obtained by subjecting the neurotransmission time difference to the cognitive correction. The digital vibration signal sample for the foot may be output earlier than the digital vibration signal sample for the hand by about 10 to 50 ms including a value between the neurotransmission time difference and the value obtained by subjecting the neurotransmission time difference to the cognitive correction. Note that the description described in this paragraph applies to a case that the ear for perceiving a sound is included as a body site.

The description above similarly applies even to a case that the time series signal includes a digital acoustic signal in addition to the digital vibration signal, except for that the vibration includes air vibration and the body site includes an ear, and the farther the body site given the vibration from the brain, the longer the delay time is taken from when the vibration is actually exerted until the user perceives the vibration. As such, the reproduction apparatus 20 earlier outputs time series signal samples to be perceived at the same time (a digital acoustic signal sample and a digital vibration signal sample for each body site) to the body site farther from the brain. More precisely, the reproduction apparatus 20 outputs a plurality of time series signals with a time difference provided such that each of the time series signal samples for the respective body sites to be perceived at the same time is earlier output to the body site that is farther from the brain.

For example, in a case of outputting four kinds of time series signals including a digital acoustic signal for a left ear, a digital acoustic signal for a right ear, a digital vibration signal for a neck, and a digital vibration signal for a back, the reproduction apparatus 20 is only required to output four kinks of time series signals such that, among the time series signal samples to be perceived at the same time, a digital vibration signal sample for the back is the earliest, next is of a digital vibration signal sample for the neck, and the latest are of digital acoustic signal samples for the left and right ears.

Note that the reproduction apparatus 20 may store a plurality of time series signals provided with the time difference described above in the storage and read the plurality of time series signals from the storage to output as they are. The reproduction apparatus 20 may store a plurality of time series signals provided with no time difference described above in the storage and provide the time difference described above to the plurality of time series signals read from the storage to output. Similarly, the reproduction apparatus 20 may receive a plurality of time series signals provided with the time differences described above and output the received plurality of time series signals as they are. The reproduction apparatus 20 may receive a plurality of time series signals with no time differences described above and provide the time difference described above to the received plurality of time series signals to output. Because it is sufficient that the time difference is provided to the signal that is finally presented, the reproduction apparatus 20 may output a plurality of time series signals provided with no time differences described above, and the vibration presentation interface apparatus 30 may output a plurality of analog signals provided with the time difference described above.

Magnitude and Frequency Characteristics of Vibration Signal

As described above, the vibrations given to the body sites of the user are transmitted to the brain through the nerves. The vibrations given to the body sites of the user are demodulated depending on structures of the body sites or characteristics of the nerves and transmitted to the brain. As such, the reproduction apparatus 20 outputs each digital vibration signal provided with inverse characteristics of the modulation characteristics of each body site as a digital vibration signal for the body site. For example, in a case that the first body site is a body site where a low frequency component of the vibration given is transmitted more strongly to the brain than the second body site, the reproduction apparatus 20 outputs the digital vibration signal for the first body site and the digital vibration signal for the second section such that the low frequency component of the digital vibration signal for the first section is smaller than the digital vibration signal for the second section. For example, in a case that the first body site is a body site where a vibration given is transmitted more strongly to the brain than the second body site, the reproduction apparatus 20 outputs the digital vibration signal for the first body site and the digital vibration signal for the second section such that a magnitude of the digital vibration signal for the first section is smaller than the digital vibration signal for the second section.

Note that because it is sufficient that the magnitude or the frequency characteristics are provided to the signal that is finally presented, a magnitude and frequency characteristics may be provided to a digital vibration signal for each body site stored or received by the reproduction apparatus 20. The reproduction apparatus 20 may, with no magnitude or frequency characteristics being provided to a digital vibration signal stored or received by the reproduction apparatus 20, provide a magnitude and frequency characteristics to the digital vibration signal to output the resultant as a digital vibration signal for each body site. The reproduction apparatus 20 may output a digital vibration signal provided with no magnitude or frequency characteristics, and the vibration presentation interface apparatus 30 may provide a magnitude and frequency characteristics to the digital vibration signal to output an analog vibration signal for each body site.

Third Embodiment

In the case of presenting an optimized vibration to each body site as in the second embodiment, it is preferable that a presentation target body site be selectable for each channel, and this embodiment is described as a third embodiment.

A hardware configuration of the vibration presentation system 10 according to the third embodiment is the same as the hardware configurations of the vibration presentation systems 10 according to the first and second embodiments. The vibration presentation system 10 according to the third embodiment is different from the vibration presentation systems 10 according to the first and second embodiments in that the reproduction apparatus 20 or the vibration presentation interface apparatus 30 is provided with a user interface for the user to select the presentation target body site for each channel. The differences between the third embodiment and the first and second embodiments are described below.

Configuration in Which User Interface for User to Select Presentation Target Body Site for Each Channel Is Provided to Reproduction Apparatus 20

Figure 2:
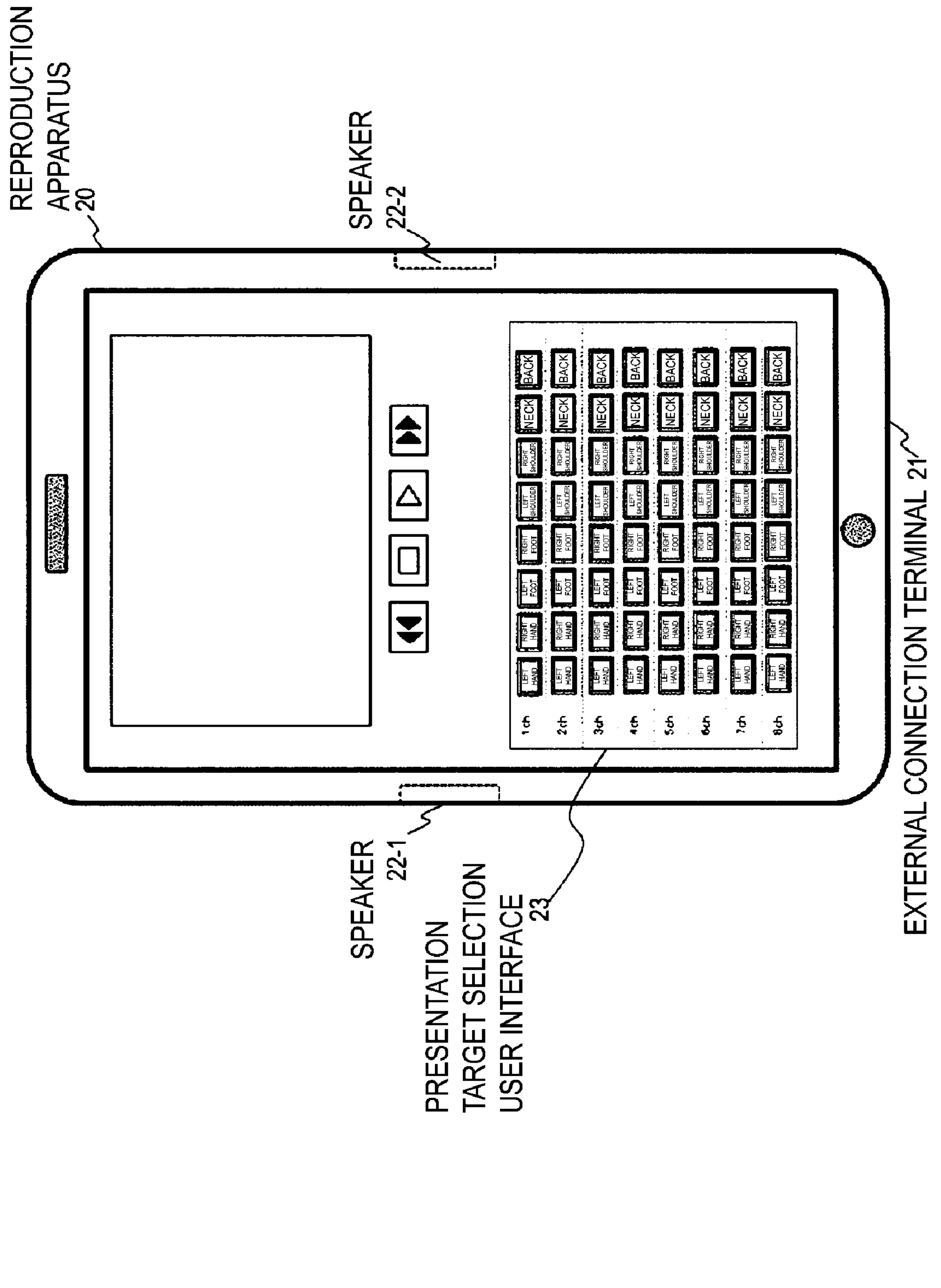
FIG. 2 is a diagram illustrating a reproduction apparatus 20 provided with a presentation target selection user interface 23.

The reproduction apparatus 20 provided with a user interface for the user to select the presentation target body site for each channel includes a presentation target selection user interface 23 that is displayed on a touch screen of the reproduction apparatus 20 which is, for example, a smart phone or a tablet terminal, and receives a touch input of the user, as illustrated in FIG. 2. The presentation target selection user interface 23 is for allowing the user to select one body site as a vibration presentation target from a plurality of predefined body sites for each channel.

The presentation target selection user interface 23 includes buttons corresponding to the plurality of respective predefined body sites for each channel. The reproduction apparatus 20 outputs a digital vibration signal for the body site corresponding to the button receiving the touch input for each channel.

FIG. 2 illustrates the reproduction apparatus 20 provided with eight predefined body sites including the left hand, right hand, left foot, right foot, left shoulder, right shoulder, neck, and back, and eight channels. The presentation target selection user interface 23 illustrated in FIG. 2 includes buttons designated as left hand, right hand, left foot, right foot, left shoulder, right shoulder, neck, and back for each channel of the first to eighth channels. For example, in a case that the reproduction apparatus 20 receives a touch input to the button of left hand for the first channel, the reproduction apparatus 20 outputs a digital vibration signal for left hand as a digital vibration signal of the first channel.

Note that the presentation target selection user interface 23 may include a button for selecting an acoustic signal for each channel in addition to the buttons corresponding to the plurality of respective body sites described above, and may include, for example, a button corresponding to each channel of a stereo acoustic signal. In this case, when the button receiving the touch input is a button corresponding to any of the channels of the acoustic signals, the reproduction apparatus 20 outputs a digital acoustic signal of the corresponding channel, for each channel.

The presentation target selection user interface 23 may include a selection switch on the touch screen, the selection switch being provided with selection positions corresponding to the plurality of respective predefined body sites for each channel, instead of including the buttons on the touch screen corresponding to the plurality of respective predefined body sites for each channel.

Configuration in Which User Interface for User to Select Presentation Target Body Site for Each Channel Is Provided to Vibration Presentation Interface Apparatus 30

Figure 3:
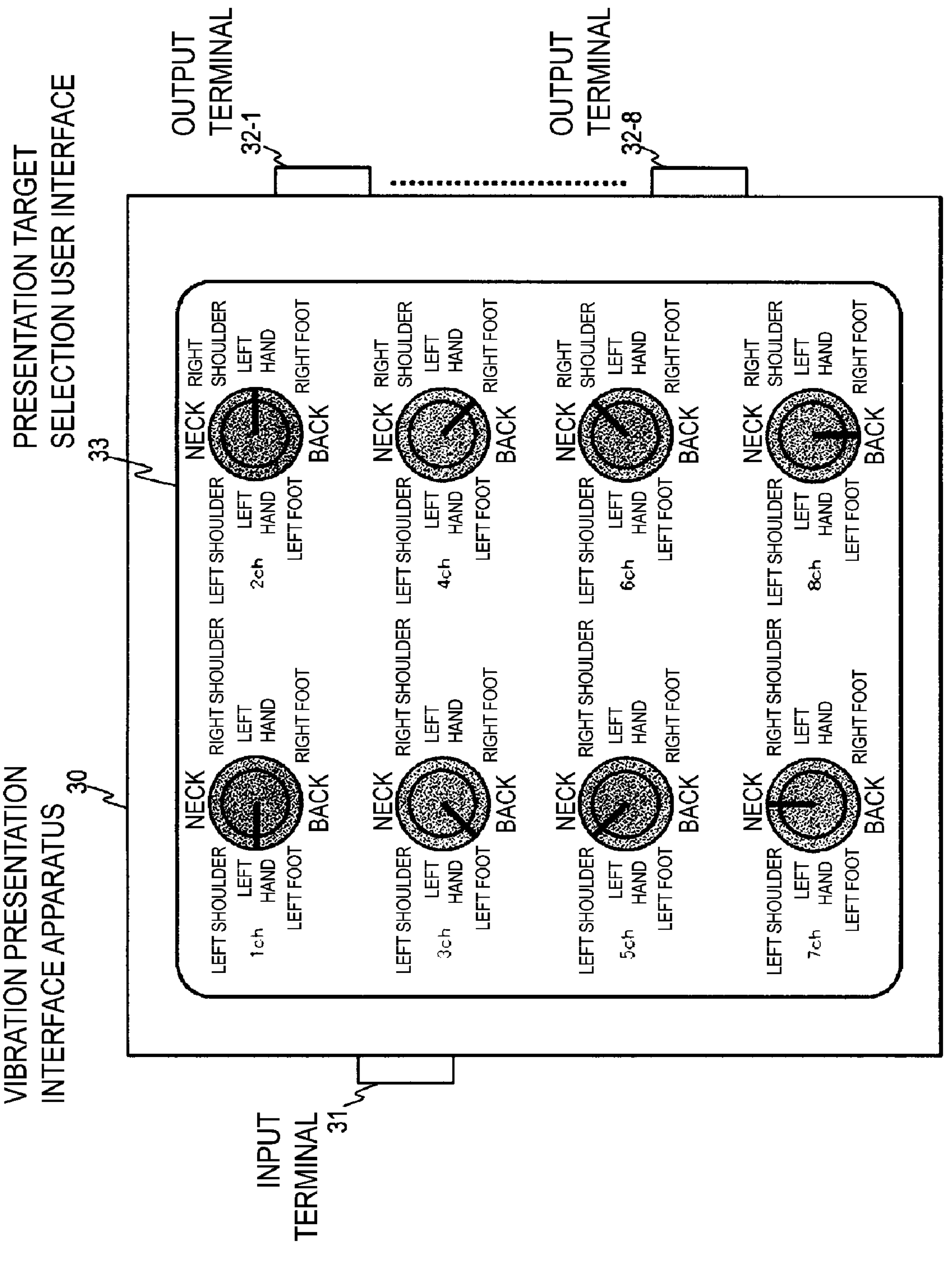
FIG. 3 is a diagram illustrating a vibration presentation interface apparatus 30 provided with a presentation target selection user interface 33.

The vibration presentation interface apparatus 30 provided with a user interface for the user to select the presentation target body site for each channel includes a presentation target selection user interface 33 that is arranged on, for example, a housing of the vibration presentation interface apparatus 30 to receive a selection operation of the user, as illustrated in FIG. 3. The presentation target selection user interface 33 is for allowing the user to select one body site as a vibration presentation target from a plurality of predefined body sites for each channel.

For example, the presentation target selection user interface 33 has a configuration in which the buttons in the presentation target selection user interface 23 illustrated in FIG. 2 are replaced with physical buttons, and includes buttons corresponding to the plurality of respective predefined body sites for each channel. In a case that the presentation target selection user interface 33 has this configuration, the vibration presentation interface apparatus 30 outputs an analog vibration signal for a body site corresponding to the depressed button for each channel.

For example, the presentation target selection user interface 33 includes a rotary switch provided with selection positions corresponding to the plurality of respective predefined body sites for each channel as illustrated in FIG. 3. In a case that the presentation target selection user interface 33 has this configuration, the vibration presentation interface apparatus 30 outputs an analog vibration signal for a body site corresponding to the selection position of the rotary switch for each channel.

FIG. 3 illustrates the vibration presentation interface apparatus 30 provided with eight predefined body sites including the left hand, right hand, left foot, right foot, left shoulder, right shoulder, neck, and back, and eight channels. The presentation target selection user interface 33 includes the rotary switch provided with the selection positions designated as left hand, right hand, left foot, right foot, left shoulder, right shoulder, neck, and back for each channel of the first to eighth channels. For example, in a case that the selection position of the rotary switch for the first channel is set to the left hand, the vibration presentation interface apparatus 30 outputs an analog vibration signal for left hand as an analog vibration signal of the first channel.

Note that the presentation target selection user interface 33 may include a selection position or button for selecting an acoustic signal for each channel in addition to the selection positions and buttons corresponding to the plurality of respective body sites described above, and may include, for example, a selection position or button corresponding to each channel of a stereo acoustic signal. In this case, when the selection position of the rotary switch corresponds to any of the channels of the acoustic signals, or the depressed button is a button corresponding to any of the channels of the acoustic signals, the vibration presentation interface apparatus 30 outputs an analog acoustic signal of the corresponding channel, for each channel.

The presentation target selection user interface 33 may include a lever switch rather than the rotary switch, or any switch provided with a plurality of selection positions.

Fourth Embodiment

In the case of presenting a plurality of optimized vibrations to each body site as in the second embodiment, a presentation target body site may be selectable for each channel as in the third embodiment, but it is preferable that a combination of presentation target body sites for all the channels be selectable in one operation. This embodiment is described as a fourth embodiment.

A hardware configuration of the vibration presentation system 10 according to the fourth embodiment is the same as the hardware configurations of the vibration presentation systems 10 according to the first and second embodiments. The vibration presentation system 10 according to the fourth embodiment is different from the vibration presentation systems 10 according to the first and second embodiments in that the reproduction apparatus 20 or the vibration presentation interface apparatus 30 is provided with a user interface for the user to collectively select the combination of the presentation target body sites for all the channels. The differences between the fourth embodiment and the first and second embodiments are described below.

Configuration in Which User Interface for User to Correctively Select Combination of Presentation Target Body Sites for All Channels Is Provided to Reproduction Apparatus 20

Figure 4:
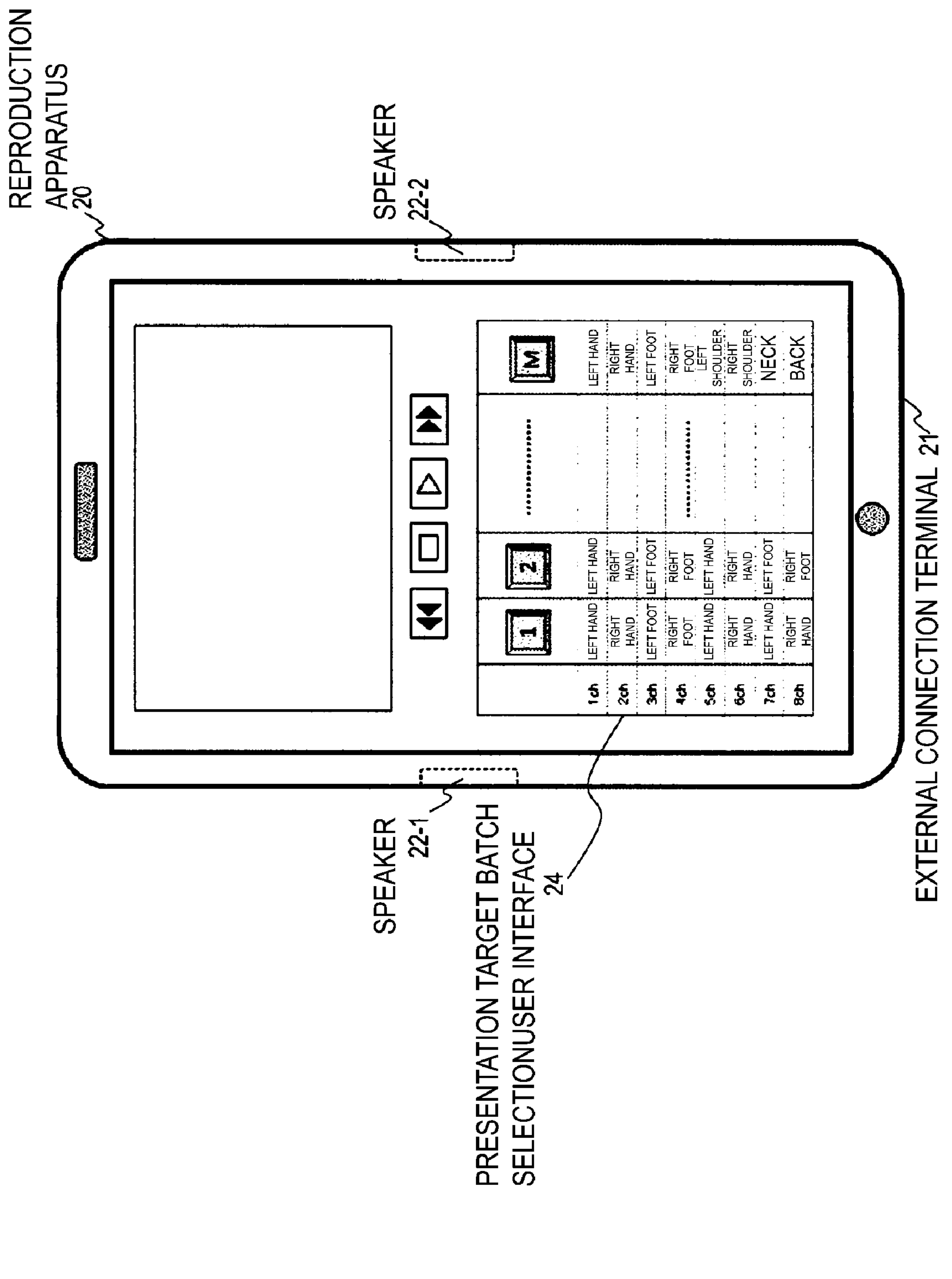
FIG. 4 is a diagram illustrating the reproduction apparatus 20 provided with a presentation target batch selection user interface 24.

The reproduction apparatus 20 provided with a user interface for the user to collectively select the combination of the presentation target body sites for all the channels includes a presentation target batch selection user interface 24 that is displayed on a touch screen of the reproduction apparatus 20 which is, for example, a smart phone or a tablet terminal, and receives a touch input of the user, as illustrated in FIG. 4. The presentation target batch selection user interface 24 is for allowing the user to select one combination of a plurality of predefined combinations of the presentation target body sites for all the channels as a combination of vibration presentation target body sites.

The presentation target batch selection user interface 24 includes a plurality of (or M, where M is an integer of 2 or more) combinations of one button and designations of the presentation target body sites for each channel. The reproduction apparatus 20 outputs digital vibration signals for the body sites included in the combination corresponding to the button receiving the touch input for each channel.

FIG. 4 illustrates the reproduction apparatus 20 provided with eight predefined body sites including the left hand, right hand, left foot, right foot, left shoulder, right shoulder, neck, and back, and eight channels. The presentation target batch selection user interface 24 illustrated in FIG. 4 includes a combination of the first button and designations of a left hand as the presentation target for the first channel, a right hand as the presentation target for the second channel, a left hand as the presentation target for the third channel, a right hand as the presentation target for the fourth channel, a left hand as the presentation target for the fifth channel, a right hand as the presentation target for the sixth channel, a left hand as the presentation target for the seventh channel, and a right hand as the presentation target for the eighth channel, a combination of the second button and designations of a left hand as the presentation target for the first channel, a right hand as the presentation target for the second channel, a left foot as the presentation target for the third channel, a right foot as the presentation target for the fourth channel, a left hand as the presentation target for the fifth channel, a right hand as the presentation target for the sixth channel, a left foot as the presentation target for the seventh channel, and a right foot as the presentation target for the eighth channel, . . . , and a combination of the M-th button and designations of a left hand as the presentation target for the first channel, a right hand as the presentation target for the second channel, a left foot as the presentation target for the third channel, a right foot as the presentation target for the fourth channel, a left shoulder as the presentation target for the fifth channel, a right shoulder as the presentation target for the sixth channel, a neck as the presentation target for the seventh channel, and a back as the presentation target for the eighth channel. For example, in a case that the reproduction apparatus 20 receives a touch input of the second button, the reproduction apparatus 20 outputs a digital vibration signal for the left hand as a digital vibration signal of the first channel, outputs a digital vibration signal for the right hand as a digital vibration signal of the second channel, outputs a digital vibration signal for the left foot as a digital vibration signal of the third channel, outputs a digital vibration signal for the right foot as a digital vibration signal of the fourth channel, outputs a digital vibration signal for the left hand as a digital vibration signal of the fifth channel, outputs a digital vibration signal for the right hand as a digital vibration signal of the sixth channel, outputs a digital vibration signal for the left foot as a digital vibration signal of the seventh channel, and outputs a digital vibration signal for the right foot as a digital vibration signal of the eighth channel.

Note that the presentation target batch selection user interface 24 may include a designation of an acoustic signal instead of the designation of the presentation target body site for any channel, and may include, for example, a designation corresponding to each channel of a stereo acoustic signal. In other words, the combinations of the presentation target body sites for all the channels may include a presentation of an acoustic signal, rather than the presentation target body site for any channel. In this case, the reproduction apparatus 20 outputs a digital acoustic signal of the channel, for the channel presenting an acoustic signal included in the combination corresponding to the button that receives the touch input.

The presentation target batch selection user interface 24 may include a selection switch provided with M selection positions, instead of including M buttons on the touch screen. In this case, the presentation target batch selection user interface 24 may be configured to combine the respective selection positions of the selection switch with the designations of the presentation target body sites for each channel of the plurality of channels.

Configuration in Which User Interface for User to Correctively Select Combination of Presentation Target Body Sites for All Channels Is Provided to Vibration Presentation Interface Apparatus 30

Figure 5:
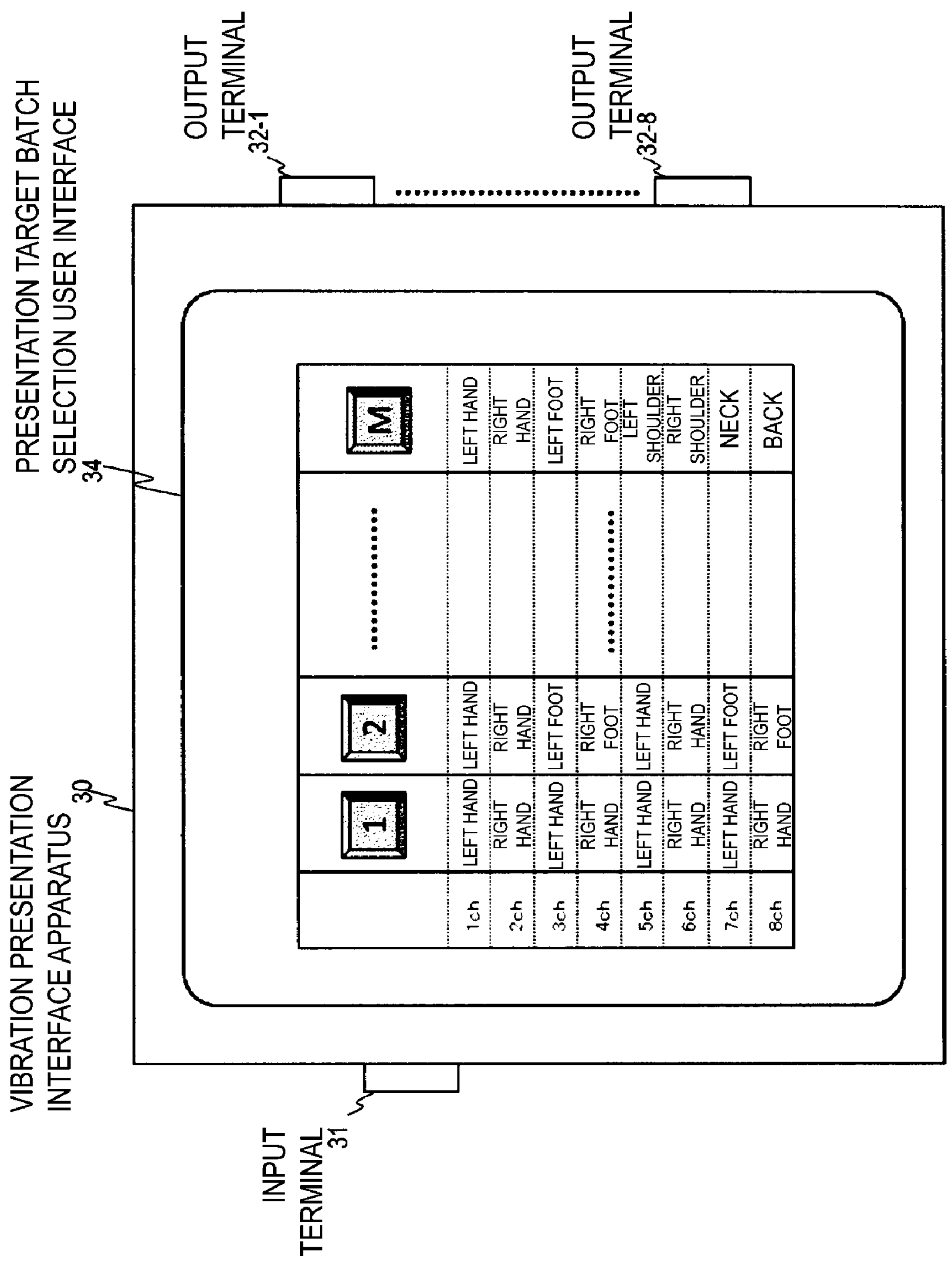
FIG. 5 is a diagram illustrating the vibration presentation interface apparatus 30 provided with a presentation target batch selection user interface 34.

The vibration presentation interface apparatus 30 provided with a user interface for the user to collectively select the combination of the presentation target body sites for all the channels includes a presentation target batch selection user interface 34 that is arranged on, for example, a housing of the vibration presentation interface apparatus 30 to receive a selection operation of the user, as illustrated in FIG. 5. The presentation target batch selection user interface 34 is for allowing the user to select one combination of a plurality of predefined combinations of combinations of the presentation target body sites for all the channels as a combination of vibration presentation target body sites.

For example, the presentation target batch selection user interface 34 has a configuration in which the buttons of the presentation target batch selection user interface 24 illustrated in FIG. 4 are replaced with physical buttons as illustrated in FIG. 5, and includes a plurality of (or M, where M is an integer of 2 or more) combinations of one button and designations of the presentation target body sites for each channel. The vibration presentation interface apparatus 30 outputs an analog vibration signal for a body site included in the combination corresponding to the depressed button for each channel.

Note that the presentation target batch selection user interface 34, similar to the presentation target batch selection user interface 24, may also include a designation of an acoustic signal instead of the designation of the presentation target body site for any channel, and may include, for example, a designation corresponding to each channel of a stereo acoustic signal. In this case, the vibration presentation interface apparatus 30 outputs an analog acoustic signal of the channel, for the channel presenting an acoustic signal included in the combination corresponding to the depressed button.

The presentation target batch selection user interface 34 may include a selection switch provided with M selection positions, instead of including M buttons. In this case, the presentation target batch selection user interface 34 may be configured to combine the respective selection positions of the selection switch with the designations of the presentation target body sites for each channel of the plurality of channels.

Supplements

The foregoing description of the embodiments of the present invention has been presented for purposes of illustration and description. The foregoing description does not intend to be exhaustive and does not intend to limit the invention to the precise forms disclosed. Modifications and variations are possible from the teachings above. The embodiments have been chosen and expressed in order to provide the best demonstration of the principles of the present invention, and to enable those skilled in the art to utilize the present invention in numerous embodiments and with addition of various modifications suitable for actual use considered. All such modifications and variations are within the scope of the present invention defined by the appended claims that are interpreted according to the width provided justly lawfully and fairly.

The invention claimed is:

1. A tactile presentation system for presenting tactile signals for perception by a tactile sense for media content, the tactile presentation system comprising a processor configured to execute a method comprising: generating tactile motions corresponding to the tactile signals of a plurality of channels respectively, wherein each of the tactile signals of the plurality of channels is for any of specific body sites, and the tactile motions are provided with a time difference such that, for the tactile motions for the specific body sites to be perceived at the same time, a tactile motion for a body site of the specific body sites that is farther from a brain is earlier generated.

2. The tactile presentation system according to claim 1, wherein the time difference represents a value obtained by applying cognitive correction on a difference in neurotransmission time of the specific body sites or based on approximating the obtained value.

3. The tactile presentation system according to claim 2, wherein the value obtained by applying cognitive correction on the difference in neurotransmission time of the specific body sites is a value smaller than the difference in neurotransmission time of the specific body sites.

4. The tactile presentation system according to claim 1, wherein the time difference is a difference in neurotransmission time of the specific body sites or based on approximating the difference.

5. The tactile presentation system according to claim 1, wherein the time difference is a value between a difference in neurotransmission time of the specific body sites and a value obtained by applying cognitive correction on the difference in neurotransmission time of the specific body sites.

6. The tactile presentation system according to claim 5, wherein the value obtained by applying cognitive correction on the difference in neurotransmission time of the specific body sites is a value smaller than the difference in neurotransmission time of the specific body sites.

7. The tactile presentation system according to claim 1, wherein the specific body sites include one or more of:

a left hand,
a right hand,
a left foot,
a right foot,
a left shoulder,
a right shoulder,
a neck, or
a back.

8. A computer-implemented method for tactile presentation using tactile signals for perception by a tactic sense for media content, comprising: generating tactile motions corresponding to the tactile signals of a plurality of channels respectively, wherein each of the tactile signals of the plurality of channels is for any of specific body sites, and the tactile motions are provided with a time difference such that, for the tactile motions for the specific body sites to be perceived at the same time, a tactile motion for a body site of the specific body sites that is farther from a brain is earlier generated.

9. The computer-implemented method according to claim 8, wherein the time difference is a value obtained by applying cognitive correction on a difference in neurotransmission time of the specific body sites or based on approximating the obtained value.

10. The computer-implemented method according to claim 8, wherein the time difference is a difference in neurotransmission time of the specific body sites or based on approximating the difference.

11. The computer-implemented method according to claim 8, wherein the time difference is a value between a difference in neurotransmission time of the specific body sites and a value obtained by applying cognitive correction on the difference in neurotransmission time of the specific body sites.

12. The computer-implemented method according to claim 11, wherein the value obtained by applying cognitive correction on the difference in neurotransmission time of the specific body sites is a value smaller than the difference in neurotransmission time of the specific body sites.

13. The computer-implemented method according to claim 8, wherein the specific body sites include one or more of:

a left hand,
a right hand,
a left foot,
a right foot,
a left shoulder,
a right shoulder,
a neck, or
a back.

14. The computer-implemented method according to claim 9, wherein the value obtained by applying cognitive correction on the difference in neurotransmission time of the specific body sites is a value smaller than the difference in neurotransmission time of the specific body sites.

15. A computer-readable non-transitory recording medium storing computer-executable instructions for tactile presentation using tactile signals for perception by a tactic sense for media content that when executed by a processor cause a system to execute a method comprising: generating tactile motions corresponding to the tactile signals of a plurality of channels respectively, wherein each of the tactile signals of the plurality of channels is for any of specific body sites, and the tactile motions are provided with a time difference such that, for the tactile motions for the specific body sites to be perceived at the same time, a tactile motion for a body site of the specific body sites that is farther from a brain is earlier generated.

16. The computer-readable non-transitory recording medium according to claim 15, wherein the time difference is a value obtained by applying cognitive correction on a difference in neurotransmission time of the specific body sites or based on approximating the obtained value.

17. The computer-readable non-transitory recording medium according to claim 16, wherein the value obtained by applying cognitive correction on the difference in neurotransmission time of the specific body sites is a value smaller than the difference in neurotransmission time of the specific body sites.

18. The computer-readable non-transitory recording medium according to claim 15, wherein the time difference is a difference in neurotransmission time of the specific body sites or based on approximating the difference.

19. The computer-readable non-transitory recording medium according to claim 15, wherein the time difference is a value between a difference in neurotransmission time of the specific body sites and a value obtained by applying cognitive correction on the difference in neurotransmission time of the specific body sites.

20. The computer-readable non-transitory recording medium according to claim 15, wherein the specific body sites include one or more of:

a left hand,
a right hand,
a left foot,
a right foot,
a left shoulder,
a right shoulder,
a neck, or
a back.

* * * * *